US007939180B2

(12) United States Patent
Fujii et al.

(10) Patent No.: US 7,939,180 B2
(45) Date of Patent: May 10, 2011

(54) RESIN PRODUCT

(75) Inventors: Tetsuya Fujii, Aichi-ken (JP); Chiharu Totani, Aichi-ken (JP); Hiroshi Watarai, Aichi-ken (JP); Takayasu Ido, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 960 days.

(21) Appl. No.: 11/602,514

(22) Filed: Nov. 21, 2006

(65) Prior Publication Data

US 2007/0115167 A1 May 24, 2007

(30) Foreign Application Priority Data

Nov. 21, 2005 (JP) ............................. P-2005-336424
Sep. 1, 2006 (JP) ............................. P-2006-237911

(51) Int. Cl.
*B32B 3/10* (2006.01)
*B32B 15/04* (2006.01)
*B32B 15/08* (2006.01)

(52) U.S. Cl. ........ 428/626; 428/629; 428/632; 428/642; 428/666; 428/215; 428/336

(58) Field of Classification Search .................. 428/626, 428/614, 615, 629, 632, 642, 666, 687, 220, 428/213, 215, 332, 336
See application file for complete search history.

(56) References Cited

U.S. PATENT DOCUMENTS

2002/0108708 A1* 8/2002 Murano ..................... 156/307.3
2003/0031891 A1* 2/2003 Fields ........................... 428/626

FOREIGN PATENT DOCUMENTS

JP A-2000-159039 6/2000
JP A-2000-344032 12/2000

* cited by examiner

*Primary Examiner* — Michael La Villa
(74) *Attorney, Agent, or Firm* — Posz Law Group, PLC

(57) ABSTRACT

A resin product (e.g., a millimeter-wave radar device cover) comprises a plate-like resin substrate, a base film formed on the resin substrate, and a metallic gloss film having a discontinuous structure formed on the base film, a top coat, a block coat, or the like being formed as a protective film on the metal film. The metal film contains a first film having a discontinuous structure obtainable by vacuum deposition of a first metal, a modified surface obtainable by modification of the surface of the first film by bringing the surface into contact with air, and a second film having a discontinuous structure obtainable by vacuum deposition of a second metal on the modified surface.

9 Claims, 1 Drawing Sheet

RESIN PRODUCT

BACKGROUND OF THE INVENTION

1. Field of the Invention

The present invention relates to a resin product comprises a metal film such as metallic gloss film having a discontinuous structure and a process for producing the same, and a process for forming the metal film. The product is applied to various uses such as a millimeter-wave radar device cover.

2. Related Art

In order to give a driver a warning that his car comes close to a surrounding article, it has been investigated to provide a millimeter-wave radar device for distance measurement on some parts of the car, e.g., a radiator grill, a side mall, and a back panel. However, in the case that the radiator grill and the like are those having metallic gloss with a metal film, the metal film blocks or remarkably attenuates the millimeter wave. Therefore, it is necessary to cover the path of the millimeter wave of the radar device with a cover with metallic gloss and millimeter-wave-transparency for a radar device cover. In order to have millimeter-wave transparency, the metal film should have a discontinuous structure, i.e., a structure (island-like morphology) wherein the metal film is not continuous over a whole surface and a large number of fine metal films are bedded in a state that they are slightly separated from each other as islands.

In conventional millimeter-wave radar device covers, the metallic gloss film having a discontinuous structure is formed by vacuum deposition of a single metal such as In (JP-A-2000-159039 and JP-A-2000-344032 etc.). This is because a metal such as In has a property of being apt to form a discontinuous structure. Even if most of metals poor in such a property are subjected to film formation by vacuum deposition, the film structure is changed into a continuous structure to lower electric resistance and to result in insufficient millimeter-wave transparency when a film thickness region affording an apparently sufficient metallic gloss is achieved.

However, In is particularly expensive and hence there is a problem that a product cost increases. Thus, reduction of an amount of In to be used and use of a metal other than In are required.

SUMMARY OF THE INVENTION

Accordingly, an object of the invention is to obtain a metal film with sufficient metallic gloss and having a discontinuous structure even when the amount of an expensive metal to be used is reduced to lower the cost.

In order to solve the above problem, the invention adopts the following aspects (1) to (3):

(1) A resin product comprising:

a resin substrate and a metallic gloss film (or metal film) having a discontinuous structure containing a first film having a discontinuous structure obtainable by vacuum deposition of a first metal on the resin substrate, a modified surface obtainable by modification of the surface of the first film by bringing the surface into contact with air, and a second film having a discontinuous structure obtainable by vacuum deposition of a second metal on the modified surface;

(2) A process for producing a resin product, which comprises forming a metallic gloss film (or metal film) having a discontinuous structure, comprising:

a step of forming a first film having a discontinuous structure by vacuum deposition of a first metal on the resin substrate, a step of modifying the surface of the first film by bringing the surface into contact with air, and a step of forming a second film having a discontinuous structure by vacuum deposition of a second metal on the modified surface;

(3) A process for forming a metallic gloss film having a discontinuous structure, comprising:

a step of forming a first film having a discontinuous structure by vacuum deposition of a first metal, a step of modifying the surface of the first film by bringing the surface into contact with air, and a step of forming a second film having a discontinuous structure by vacuum deposition of a second metal on the modified surface.

With regard to individual factors in these means, examples of embodiments are as follows.

1. Resin Substrate

The form of the resin substrate is not particularly limited but a board, a sheet, a film, or the like can be exemplified. The resin for the resin substrate is not particularly limited but is preferably a thermoplastic resin, and PC (polycarbonate), an acrylic resin, polystyrene, PVC (polyvinyl chloride), a polyurethane, or the like can be exemplified.

2. Base Film

In the invention, a base film which may become a grounding of the metal film may or may not be formed on the resin substrate. The base film is not particularly limited but the following can be exemplified.

2-1. Base Film Formed of an Organic Compound

A coated film formed by applying an organic coating material (acrylic coating material or the like) can be exemplified. The film thickness is preferably from about 0.5 to 20 μm.

2-2. Base Film Formed of an Inorganic Compound

A coated film formed by applying an inorganic coating material (one containing a metal compound such as $SiO_2$ or $TiO_2$ as a main component), a thin film formed of a metal compound attached by physical vacuum deposition, or the like can be exemplified.

3. Metal Film (Metallic Gloss film)

The mechanism of the formation of a metallic gloss film having a discontinuous structure in the invention is presumed as follows: after the first film having a discontinuous structure (island-like morphology) is formed by vacuum deposition of the first metal, when the surface of the first film is brought into contact with air, a modified surface inhibiting continuous growth of the second metal to be vacuum-deposited thereon is formed by some sort of action with air (unclear at present) and hence a discontinuous structure is formed with maintaining the first discontinuous structure even if the second metal is apt to form a continuous structure.

3-1. Deposited Metal

Thus, the first metal is preferably a metal which is intrinsically apt to form a discontinuous structure by vacuum deposition and In, Cr, or the like can be exemplified as such a metal. On the other hand, the second metal is not particularly limited and may be a metal which is apt to form a discontinuous structure by vacuum deposition or may be a metal which is apt to form a continuous structure.

Accordingly, the first metal and the second metal may be the same metal or different metals. In the case of different metals, combinations of the first metal and the second metal are exemplified as follows:

(a) a combination that the first metal is In and the second metal is Cr or Al;

(b) a combination that the first metal is Cr and the second metal is In.

3-2. Film Thickness of Metal Film

The thickness of the metal film is not particularly limited but is preferably from 10 to 100 nm. When the thickness is less than 10 nm, the metallic gloss tends to be lowered. When the thickness exceeds 100 nm, the electric resistance is decreased and, for example, the millimeter-wave transparency tends to be impaired.

When the first film and the second film are separately considered, the first film preferably has a thickness of from 5 to 30 nm. When the thickness is less than 5 nm, the film becomes unstable. When the thickness is more than 30 nm, the two-film constitution loses its meaning (advantage). Moreover, the second film preferably has a thickness of from 5 to 95 nm. When the thickness is less than 5 nm, the film cannot exhibit a color effect. When the thickness is more than 95 nm, the island-like morphology is destroyed and durability and other properties, e.g., millimeter-wave transparency are deteriorated.

3-3. Surface Modification Treatment

With regard to the modification treatment of surface of the first film by bringing the surface into contact with air, the following can be exemplified as the method: a method of introducing air into the chamber in a vacuum state which has been used for vacuum deposition or a method of leaving it open to the air, after the first film has been formed by vacuum deposition. Moreover, the modification time for bringing the surface of the first film into contact with air is preferably 30 minutes or longer.

4. Other Films or the Like

It is preferred to form a protective film for protecting the metal film on the metal film. In the case that the lower surface side of the resin substrate is a designed surface, it is suitable to form a block coat or the like as a protective film on the metal film. Furthermore, a resin back material may be injection-molded on the block coat. On the other hand, in the case that the upper surface side of the metal film is a designed surface, it is suitable to form a clear topcoat or the like as a protective film on the metal film.

5. Kinds (uses) of Resin Product

Since the metal film is discontinuous, the resin product has properties such as millimeter-wave transparency and lightening stroke-preventing property owing to high electric resistance, corrosion resistance owing to suppression of corrosion propagation, and a property that the metal film easily follows flexural movement of the resin substrate. Because of these properties, as the kinds (uses) of the resin product, the following may be exemplified without particular limitation.

(a) As uses based on the millimeter-wave transparency, a millimeter-wave radar device cover can be exemplified. The applying sites of the cover are not particularly limited but application to exterior coated products of automobiles is preferred. Particularly, the cover is suitable for use in a radiator grill, a grill cover, a side mall, a back panel, a bumper, an emblem, and the like.

(b) As uses based on the lightening stroke-preventing property, an umbrella and the like can be exemplified.

(c) As uses based on the property that the product is non-conductive only at the treated part, a printed wiring board can be exemplified.

(d) As uses based on corrosion resistance, an emblem, a radiator grill, a metallic gloss mall, or the like can be exemplified.

(e) As uses based on the property of following flexural movement, a soft metallic gloss mall or the like can be exemplified.

(f) In addition, as uses based on IR transparency, a vessel for microwave oven can be exemplified.

Moreover, the invention adopts the following aspect (4) for solving the above problem:

(4) A resin product wherein a millimeter wave round-trip transparency attenuation by the metal film is 4 dB or less (more preferably 2 dB or less), which comprises:

a resin substrate and a metallic gloss film having a discontinuous structure containing a first film obtainable by vacuum deposition of a first metal on the resin substrate and a second film obtainable by vacuum deposition of a second metal, which is different from the first metal, on the first surface.

In the means, with regard to the resin substrate, the base film, and the other films, embodiments the same as in the case of the above aspects (1) to (3) can be exemplified. With regard to the metal film, a combination that the first metal is In and the second metal is Cr can be exemplified. With regard to the film thickness, the same as in the case of the above means may be applied.

According to the invention, even when the amount of an expensive metal to be used is reduced to lower the cost, a sufficiently metallic gloss film having a discontinuous structure can be obtained.

DETAILED DESCRIPTION OF THE PREFERRED EMBODIMENTS

Figure 1:
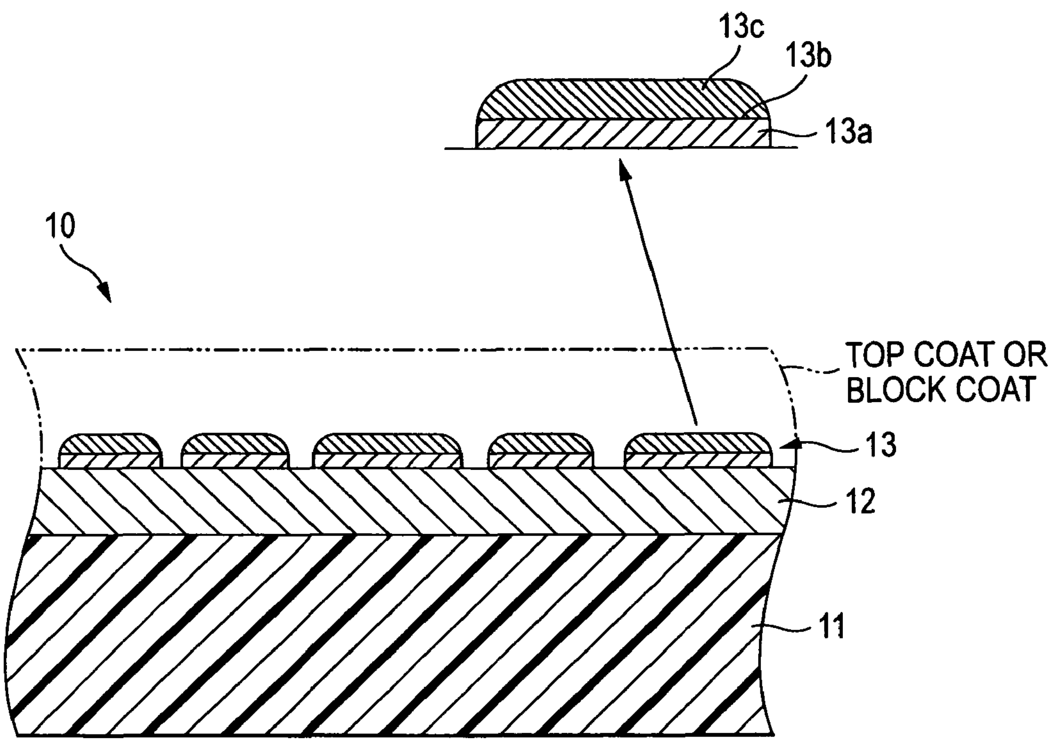
FIG. 1 is a cross-sectional view illustrating the resin product of an embodiment of the invention.

The resin product 10 (e.g., a millimeter-wave radar device cover) shown in FIG. 1 comprises a plate-like resin substrate 11, a base film 12 formed on the resin substrate 11, and a metallic gloss film 13 having a discontinuous structure formed on the base film 12, a topcoat, a block coat, or the like being formed as a protective film on the metal film. The metal film 13 contains a first film 13*a* having a discontinuous structure obtainable by vacuum deposition of a first metal, a modified surface 13*b* obtainable by modification of the surface of the first film 13*a* by bringing the surface into contact with air, and a second film 13*c* having a discontinuous structure obtainable by vacuum deposition of a second metal on the modified surface 13*b*.

The resin product 10 is produced according to the following steps. The resin substrate 11 is, for example, a plate-like one having a plate thickness of from 3 to 6 mm formed of PC (polycarbonate).

(1) A base film 12 is formed on the resin substrate 11.

(2) A step of placing the resin substrate 11 fitted with the base film 12 in a chamber, evacuating the inside of the chamber, and forming a first film having a discontinuous structure by vacuum deposition of a first metal on the base film 12.

(3) A step of modifying the surface of the first film by leaving the chamber in a vacuum state open to the air to bring the surface into contact with the air.

(4) A step of evacuating the inside of the chamber again and forming a second film having a discontinuous structure by vacuum deposition of a second metal on the modified surface.

According to the steps of (2) to (4), a metallic gloss film having a discontinuous structure is formed.

EXAMPLES

Using a plate-like PC substrate having a plate thickness of 5 mm, a base film having a film thickness of 5 μm formed of an acrylurethane-based coating material was formed on the PC substrate. As shown in the following Table 1, a metal film of each of Examples 1 and 2 and Comparative Examples 1 to 5 was then formed on the base film and the film thickness and millimeter-wave round-trip transparency attenuation (frequency of millimeter wave: 76 GHz) were investigated. As the millimeter-wave round-trip transparency attenuation, transparency attenuation (absolute value) was determined at the time when the millimeter wave passed through both of the PC substrate (including the base film; the same shall be applied to hereinafter) and the metal film and returned. Then, millimeter round-trip transparency attenuation (deposited portion) owing to the metal film alone was determined by subtracting, from the absolute value, transparency attenuation at the time when the millimeter wave passed trough the PC substrate alone and returned.

vacuum deposition of Cr. The millimeter-wave transparency was still no good. The fact means that the surface of the In film is not modified by such a degree of oxygen and any remarkable change does not occur.

Comparative Example 4 was an example wherein the time for exposing the surface of the In film to oxygen gas by introducing oxygen gas was elongated to 20 minutes in Comparative Example 3. The millimeter-wave transparency was still no good. Therefore, it is considered that the surface of the In film is not modified by oxygen.

Example 1 was an example wherein an In film having a film thickness of 10 nm was formed by vacuum deposition of In, the surface of the In film was exposed to the air by leaving a chamber open to the air and the state was maintained for 45 minutes, thereafter the inside of the chamber was evacuated

TABLE 1

| | | | Substrate measurement (No deposition) t = 5 mm PC plate | Comparative Example 1 (Cr deposition alone) | Comparative Example 2 (Continuous 2 layers) | Comparative Example 3 (5 minutes of $O_2$ introduction) | Comparative Example 4 (20 minutes of $O_2$ introduction) | Example 1 (45 minutes of air) | Example 2 (45 minutes of air) In film thickness up) | Comparative Example 5 $O_2$ introduction at film thickness of Example 2) |
|---|---|---|---|---|---|---|---|---|---|---|
| Process for film formation | First film | In film thickness (nm) | | 0 | 3 | 3 | 3 | 10 | 15 | 15 |
| | Modification treatment | $O_2$ introduction (Pa) (time) | — | — | — | $10^{-3}$ => $10^{-2}$ (5 minutes) | $10^{-3}$ => $10^{-2}$ (20 minutes) | — | — | $10^{-3}$ => $10^{-2}$ (5 minutes) |
| | | Open to air (Pa) (time) | — | — | — | — | — | $10^5$ (45 minutes) | $10^5$ (45 minutes) | — |
| | Second frim | Cr thickness (nm) | — | 30 | 27 | 27 | 27 | 20 | 15 | 15 |
| Property | Millimeter-wave round-trip transparency attenuation dB (absolute value) | | 2.88 | 6.37 | 6.83 | 6.54 | 7.19 | 3.92 | 3.14 | 14.79 |
| | Millimeter-wave round-trip transparency attenuation dB (deposited portion) | | 0 | 3.49 | 3.95 | 3.66 | 4.31 | 1.04 | 0.24 | 11.9 |

When the millimeter round-trip transparency attenuation owing to the PC substrate alone was measured, it was found to be 2.88 dB.

Comparative Example 1 was an example wherein a Cr film having a film thickness of 30 nm was formed by vacuum deposition of Cr and the millimeter round-trip transparency attenuation (deposited portion) was so large as 3.49 dB. The fact means that the Cr film does not form a sufficient discontinuous structure, the electric resistance value is low, and the millimeter-wave transparency was no good.

Comparative Example 2 was an example wherein an In film having a film thickness of 3 nm was formed by vacuum deposition of In and successively a Cr film having a film thickness of 27 nm was formed by vacuum deposition of Cr. The millimeter-wave transparency was still no good.

Comparative Example 3 was an example wherein an In film having a film thickness of 3 nm was formed by vacuum deposition of In, the surface of the In film was exposed to oxygen gas by introducing oxygen gas into the chamber to enhance the pressure in the chamber from $10^{-3}$ Pa to $10^{-2}$ Pa and the pressure was maintained for 5 minutes, thereafter the inside of the chamber was evacuated again, and successively a Cr film having a film thickness of 27 nm was formed by again, and successively a Cr film having a film thickness of 20 nm was formed by vacuum deposition of Cr. The millimeter-wave transparency (deposited portion) was so small as 1.04 dB. The fact means that the surface of the metal film formed of In film/Cr film forms a sufficient discontinuous structure and the electric resistance value is high.

Example 2 was an example wherein the film thickness of the In film is increased but the film thickness of the Cr film is decreased in Example 1. The millimeter-wave transparency (deposited portion) was further so small as 0.24 dB. This result is equal to that of the case that only an In film having a film thickness of 30 nm is formed by vacuum deposition of In and means that the metal film forms a sufficient discontinuous structure and the electric resistance is high.

According to these Examples 1 and 2, even when the amount of expensive In to be used is reduced to lower the cost, a sufficiently metallic gloss film having a discontinuous structure is obtained.

Comparative Example 5 was an example wherein the introduction of oxygen gas was conducted in Example 2 as in Comparative Example 3 instead of leaving the chamber open to the air. The millimeter-wave transparency was still no good. Therefore, it is considered that the surface of the In film is not modified by oxygen of such a pressure.

Based on the above results, through the modification of the In film, it is considered that a modified surface inhibiting continuous growth of a metal vacuum-deposited thereon is formed by some action (unclear at present) of air (in particular, probably owing to some substance(s) other than oxygen).

Incidentally, the invention is not limited to the above embodiments and can be specified with suitable change(s) within a scope which does not depart from the spirit of the invention.

What is claimed is:

1. A resin product having a metal film induced millimeter-wave round-trip transparency attenuation of 3 dB or less, comprising:

a resin substrate; and a metallic gloss film having a discontinuous structure containing a first film formed by vacuum deposition of indium on the resin substrate and a second film formed by vacuum deposition of chromium on the first film, wherein a thickness of the metallic gloss film is from 10 to 100 nm, a thickness of the first film is from 5 to 30 nm, and a thickness of the second film is from 5 to 95 nm.

2. The resin product according to claim 1, wherein the millimeter-wave round-trip transparency attenuation induced by the first and second films is 2 dB or less.

3. The resin product according to claim 1, wherein a modified surface is formed by modification of a surface of the first film by contact with air at 30 minutes or longer before the vacuum deposition of chromium on the first film.

4. A resin product comprising:

a resin substrate;

a metallic gloss film having a discontinuous structure containing a first film having a discontinuous structure formed by vacuum deposition of indium on the resin substrate;

a modified surface formed by modification of a surface of the first film by bringing the surface into contact with air; and a second film having a discontinuous structure formed by vacuum deposition of chromium on the modified surface, wherein a thickness of the metallic gloss film is from 10 to 100 nm, a thickness of the first film is from 5 to 30 nm, a thickness of the second film is from 5 to 95 nm, and a millimeter-wave round-trip transparency attenuation induced by the first and second films is 3 dB or less.

5. The resin product according to claim 4, wherein the millimeter-wave round-trip transparency attenuation induced by the first and second films is 2 dB or less.

6. The resin product according to claim 4, wherein the modified surface is formed by bringing the surface of the first film into contact with air at 30 minutes or longer.

7. A resin product comprising:

a resin substrate; and a metallic gloss film comprising:

a vacuum deposited discontinuous indium film on the resin substrate and including an air exposed modified surface; and a vacuum deposited discontinuous chromium film on the air exposed modified surface, wherein a thickness of the metallic gloss film is from 10 to 100 nm, a thickness of the vacuum deposited discontinuous indium film is from 5 to 30 nm, a thickness of the vacuum deposited discontinuous chromium film is from 5 to 95 nm, and a millimeter-wave round-trip transparency attenuation induced by the indium film and the chromium film is 3 dB or less.

8. The resin product according to claim 7, wherein the millimeter-wave round-trip transparency attenuation induced by the indium film and the chromium film is 2 dB or less.

9. The resin product according to claim 7, wherein the air exposed modified surface is formed by bringing the surface of the vacuum deposited discontinuous indium film into contact with air at 30 minutes or longer.

* * * * *